US006590978B1

(12) United States Patent
Daoud

(10) Patent No.: US 6,590,978 B1
(45) Date of Patent: Jul. 8, 2003

(54) SECURITY MECHANISM FOR SNAP LATCH DEVICES

(75) Inventor: Bassel Hage Daoud, Morris County, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/364,260

(22) Filed: Jul. 30, 1999

(51) Int. Cl.[7] .......................... H04M 1/00
(52) U.S. Cl. .................. 379/413.04; 379/438; 379/445
(58) Field of Search .......................... 379/438, 445, 379/413.04; 361/759, 760; 439/299, 301, 306, 352, 368

(56) References Cited

U.S. PATENT DOCUMENTS 3,648,223 A * 3/1972 McCray .................... 439/368
4,311,883 A * 1/1982 Kidney .................... 379/445
4,647,726 A * 3/1987 Blum .................... 379/445

* cited by examiner

*Primary Examiner*—Jack Chiang
(74) *Attorney, Agent, or Firm*—Birch, Stewart, Kolasch & Birch, LLP

(57) ABSTRACT

A device for preventing the disengagement of a latch for a customer telephone bridge includes a cap having a base member and a projection extending outwardly from the base member. A mounting bracket is selectively positioned adjacent to a customer telephone bridge. A connector is provided for securing the cap to the mounting bracket. By positioning the mounting bracket adjacent to a customer telephone bridge the projection extending from the cap is inserted into an aperture in a customer telephone bridge for preventing disengagement of the latch of the customer telephone bridge. The projection extending from the cap includes an inclined surface wedged into an aperture in a customer telephone bridge. The mounting bracket is an elongated rod positioned adjacent to a first customer telephone bridge and extending along an array of customer telephone bridges for selectively preventing disengagement of a predetermined number of latches of the array of customer telephone bridges.

20 Claims, 3 Drawing Sheets

SECURITY MECHANISM FOR SNAP LATCH DEVICES

BACKGROUND OF THE INVENTION

1. Field of the Invention

A device for preventing the disengagement of a latch for a customer telephone bridge.

2. Description of Background Art

Normally an array of customer telephone bridges are arranged in a side by side arrangement on a service board. The customer telephone bridges are designed with a latch to permit selective removal of individual customer telephone bridges from the service board. Once a customer telephone bridge is removed, it is possible for an unauthorized individual to gain access to the telephone wiring disposed behind the service board.

SUMMARY AND OBJECTS OF THE INVENTION

It is an object of the present invention to prevent unauthorized removal of a customer telephone bridge from a service board.

Another object of the present invention is to deny access to an unauthorized individual to the telephone wiring disposed behind a service board.

These and other objects of the present invention are achieved by providing a device for preventing the disengagement of a latch for a customer telephone bridge wherein a cap is provided having a base member and a projection extending outwardly from the base member. A mounting bracket is selectively positioned adjacent to a customer telephone bridge. By positioning the mounting bracket adjacent to a customer telephone bridge the projection extending from the base member is inserted into an aperture in a telephone bridge for preventing disengagement of the latch of the customer telephone bridge. The projection extending from the cap includes an inclined surface wedged into an aperture in a telephone bridge. The mounting bracket is an elongated rod positioned adjacent to a first customer telephone bridge and extending along an array of customer telephone bridges for selectively preventing disengagement of a predetermined number of latches of the array of customer telephone bridges.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
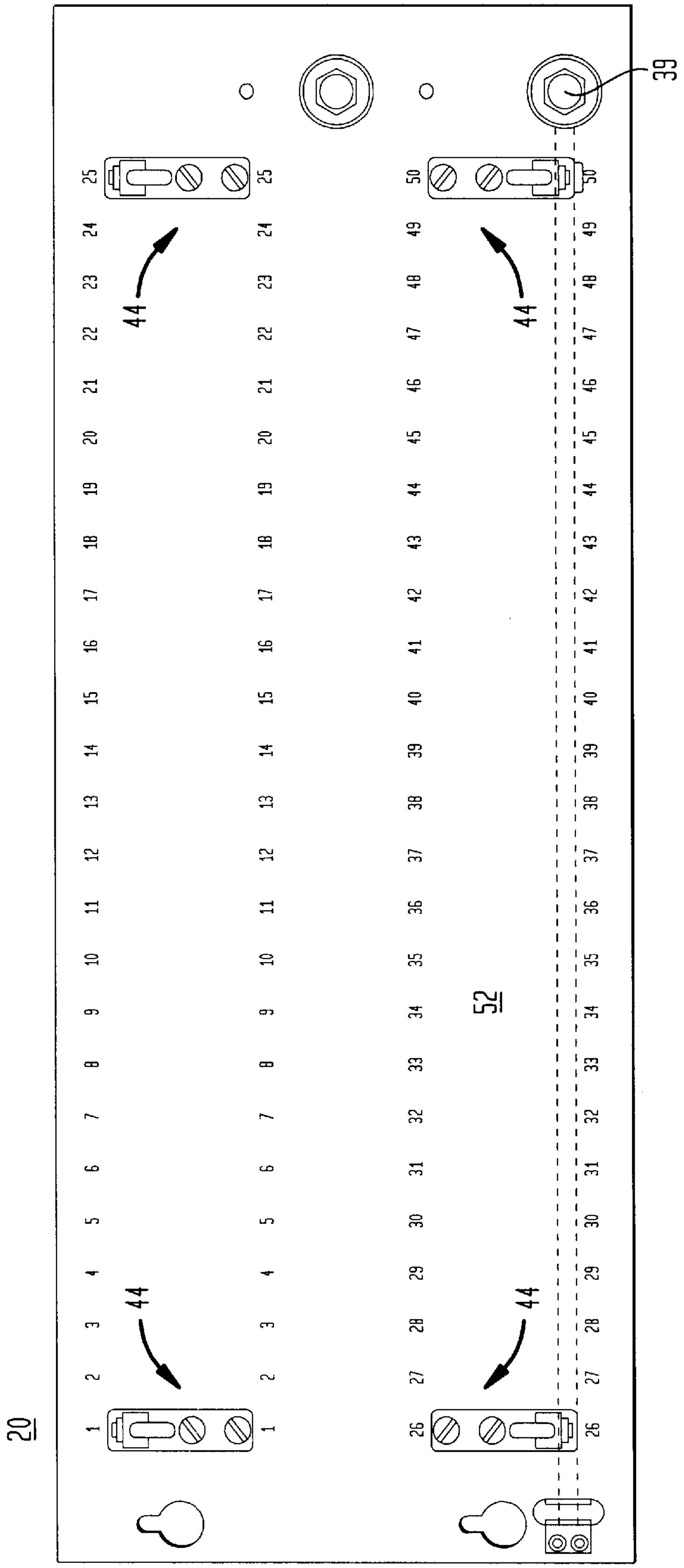
FIG. 1 is a top plan view of a service board illustrating a few customer telephone bridges secured thereto and illustrated in broken lines a mounting bracket for preventing the unauthorized removal of the customer telephone bridges from the service board.

As illustrated in FIGS. 1–4, a device 10 is provided for preventing the disengagement of a latch 42 for a customer telephone bridge 44. The device 10 includes a cap 22 having a base member 24 and a projection 26 extending outwardly from the base member 24.

A mounting bracket 32 is selectively positioned adjacent to a customer telephone bridge 44. A connector 28 is provided for securing the cap 22 to the mounting bracket 32. By positioning the mounting bracket 32 adjacent to a customer telephone bridge 44 the projection 26 extending from the cap 22 is inserted into an aperture 46 in the customer telephone bridge 44 for preventing disengagement of the latch 42 of the customer telephone bridge 44 from a service board 52.

Figure 4:
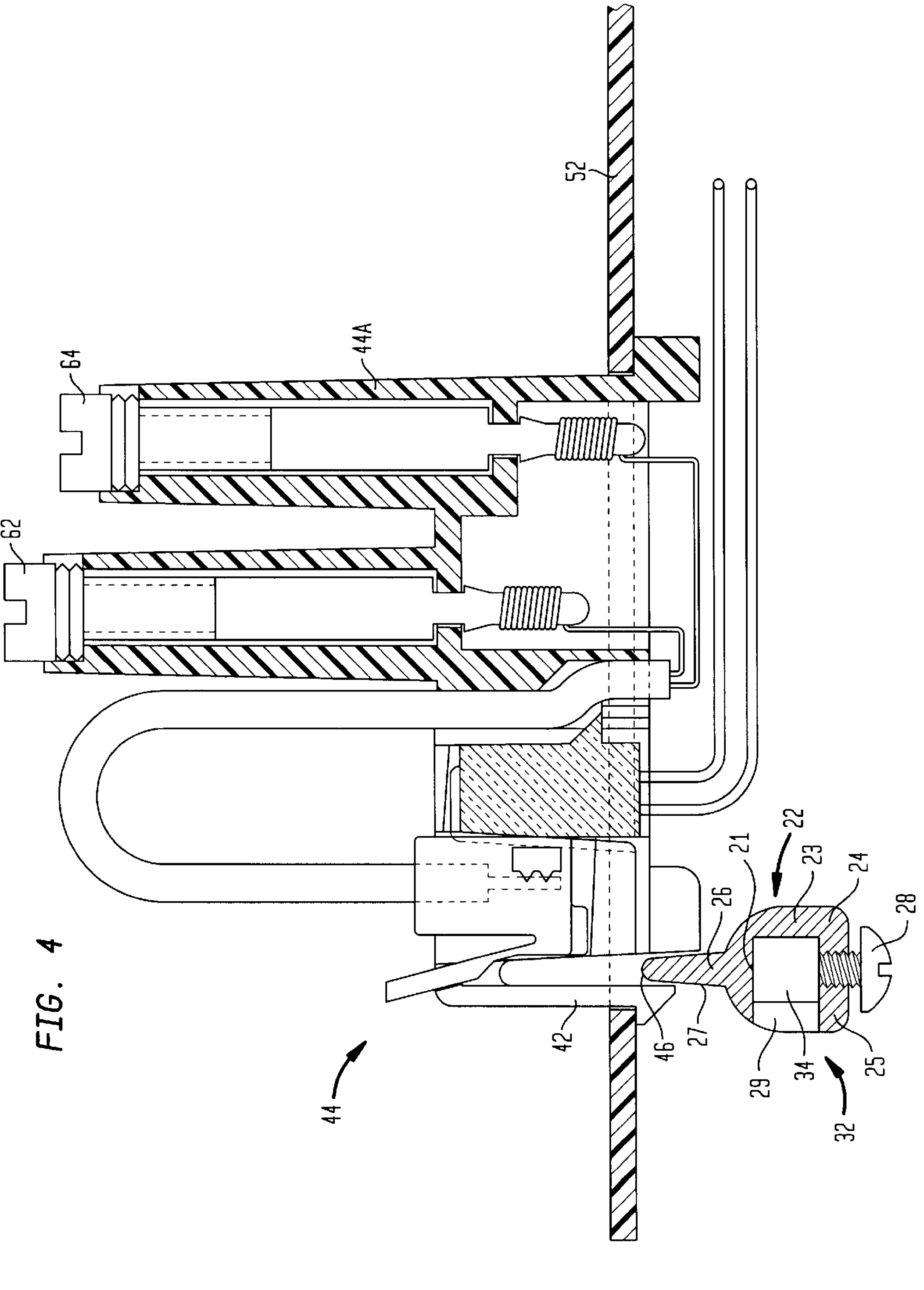
FIG. 4 is a side elevational view of a customer telephone bridge illustrating a mounting bracket with a cap having a projection extending therefrom that is engaged within an aperture in the customer telephone bridge for preventing disengagement of a latch of the customer telephone bridge.

As illustrated in FIG. 4, the projection 26 extending from tie cap 22 includes an inclined surface 27 that is designed to be wedged into the aperture 46 in a customer telephone bridge 44. The mounting bracket 32 is an elongated rod 34 positioned adjacent to a first customer telephone bridge 44A and extending along an array of customer telephone bridges for selectively preventing disengagement of a predetermined number of latches 42 of the array of customer telephone bridges 44 from the service board 52.

Figure 2:
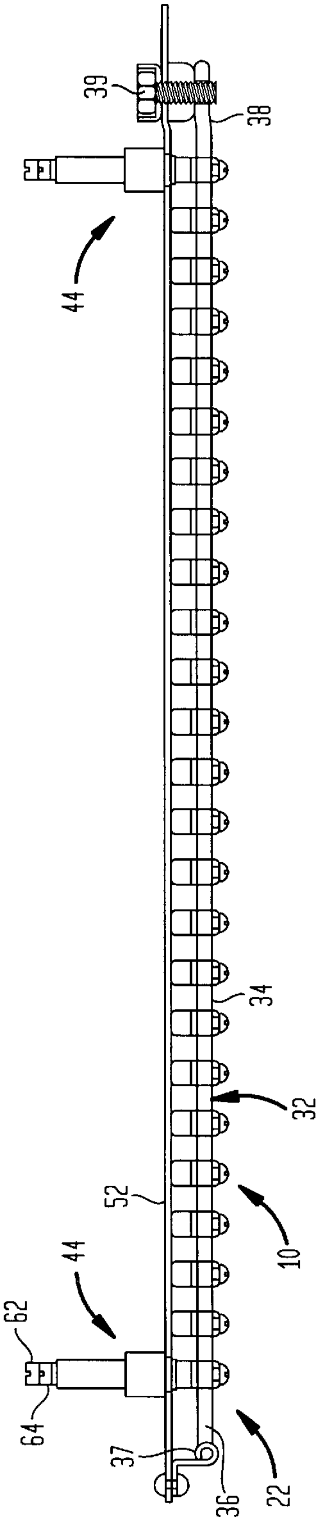
FIG. 2 is a side elevational view of a service board illustrating two customer telephone bridges secured thereto and illustrating a mounting bracket positioned in an operative position with a plurality of caps disposed on the mounting bracket for preventing the unauthorized removal of the customer telephone bridges from the service board.
Figure 3:
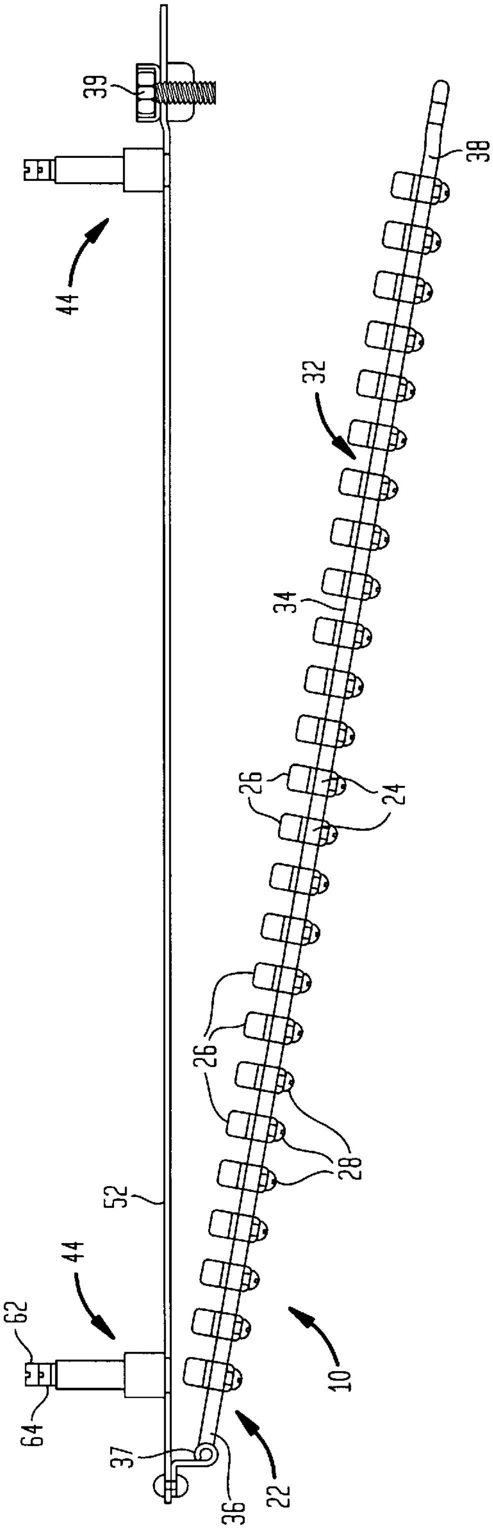
FIG. 3 is a side elevational view of a service board illustrating two customer telephone bridges secured thereto and illustrating a mounting bracket in a disengaged position with a plurality of caps disengaged from the customer telephone bridges for permitting authorized removal of the customer telephone bridges from the service board.

As illustrated in FIGS. 2 and 3, the elongated rod 34 includes a first end 36 and a distal end 38. The first end 36 is hinged at 37 to one side of the service board 52. The distal end 38 extends along an array of customer telephone bridges 44 and is secured to the service board 52 by means of a locking member 39. The locking member 39 may be a specially designed bolt that is actuated by a key issued to authorized individuals. The caps 22 are disposed along the length of the elongated rod 34 and are aligned to permit the projections 26 to be engaged within the apertures 46 in the customer telephone bridge 44 to prevent unauthorized disengagement of the latch 42 from the service board 52.

As illustrated in FIG. 3, the elongated rod 34 is hinged downwardly to permit the projections 26 to be disengaged from the apertures 46 in the customer telephone bridge 44 to permit the latch 42 to be disengaged from the service board during authorized repair.

As illustrated in FIG. 4, the elongated rod 34 includes a cap 22 mounted thereon. The cap 22 includes a first section 21, a second section 23 extending therefrom and a third section 25 extending from the second section. The connector 28 is a screw for securing the cap 22 to the elongated rod 34. An aperture 29 is formed by the first section 21, the second section 23 and the third section 25 to permit the cap 22 to be removed from the elongated rod 34. The projection 26 includes an inclined surface for wedging the projection 26 into the aperture 46 in the customer telephone bridge 44. The projection 26 being disposed within the aperture 46 prevents the disengagement of the latch 42 to enable removal of the customer telephone bridge 44.

Test access is available by utilizing the test screws 62 and 64. It is easier to maneuver a test probe relative to the test screws 62 and 64 as compared to the regular wiring disposed beneath the service board 52.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for preventing the disengagement of latches connecting a plurality of customer telephone bridges to a service board comprising:

a mounting bracket adapted to be selectively positioned adjacent to, or remote from, the plurality of customer telephone bridges; and a plurality of caps installed on said mounting bracket, each cap including a base member and a projection extending outwardly from said base member, wherein positioning said mounting bracket adjacent to the plurality of customer telephone bridges inserts said projections extending from said caps into respective apertures in the latches of the plurality of customer telephone bridges, which prevents disengagement of the latches of the customer telephone bridges from the service board, and wherein positioning said mounting bracket remote from the plurality of customer telephone bridges removes said projections extending from said caps from respective apertures in the latches of the plurality of customer telephone bridges, which allows disengagement of the latches of the customer telephone bridges from the service board.

2. The device according to claim 1, wherein each projection extending from each cap includes an inclined surface adapted to wedge into a respective one of the apertures in the latches of the plurality of customer telephone bridges.

3. The device according to claim 1, wherein said mounting bracket is an elongated rod.

4. The device according to claim 3, further comprising:

a plurality of connectors for securing said caps at predetermined locations along a length of said elongated rod.

5. The device according to claim 4, wherein said plurality of connectors are screws for releasably securing said caps on said mounting bracket.

6. The device according to claim 1, wherein each cap includes an aperture for enabling each cap to be selectively positioned along said mounting bracket.

7. The device according to claim 3, wherein said elongated rod includes a first end and a distal end, said first end for being pivotably connected to the service board.

8. The device according to claim 7, further comprising:

a removable locking member for removably connecting said distal end of said elongated rod to the service board.

9. The device according to claim 1, wherein each base member includes a first section having said projection extending outwardly therefrom, a second section extending from said first section and a third section extending from said second section, said first, second and third sections forming an enclosure for permitting mounting of said cap on said mounting bracket.

10. The device according to claim 9, and further including a connector secured to said third section for affixing said cap to said mounting bracket.

11. A combination comprising:

a service board for interconnecting telephone service wires to customer wires;

a plurality of openings formed in a row on said service board;

a plurality of customer telephone bridges, each customer telephone bridge including terminals for connection to telephone service wires and terminals for connection to customer wires;

a latch associated with each customer telephone bridge to removably secure said customer telephone bridge into one of said plurality of openings formed in said service board;

a mounting bracket adapted to be selectively positioned adjacent to, or remote from, said plurality of customer telephone bridges; and a plurality of caps installed on said mounting bracket, each cap including a base member and a projection extending outwardly from the base member, wherein positioning said mounting bracket adjacent to said plurality of customer telephone bridges inserts said projections extending from said caps into respective apertures in said latches of said plurality of customer telephone bridges, which prevents disengagement of said latches of said customer telephone bridges from said service board, and wherein positioning said mounting bracket remote from said plurality of customer telephone bridges removes said projections extending from said caps from respective apertures in said latches of said plurality of customer telephone bridges, which allows disengagement of said latches of said customer telephone bridges from said service board.

12. The device according to claim 11, wherein each projection extending from each cap includes an inclined surface adapted to wedge into a respective one of said apertures in said latches of said plurality of customer telephone bridges.

13. The device according to claim 11, wherein said mounting bracket is an elongated rod.

14. The device according to claim 13, further comprising:

a plurality of connectors for securing said caps at predetermined locations along a length of said elongated rod.

15. The device according to claim 14, wherein said plurality of connectors are screws for releasably securing said caps on said mounting bracket.

16. The device according to claim 11, wherein each cap includes an aperture for enabling each cap to be selectively positioned along said mounting bracket.

17. The device according to claim 13, wherein said elongated rod includes a first end and a distal end, said first end being pivotably connected to said service board.

18. The device according to claim 17, further comprising:

a removable locking member removably connecting said distal end of said elongated rod to said service board.

19. The device according to claim 11, wherein each base member includes a first section having said projection extending outwardly therefrom, a second section extending from said first section and a third section extending from said second section, said first, second and third sections forming an enclosure for permitting mounting of said cap on said mounting bracket.

20. The device according to claim 19, further comprising:

a connector secured to said third section for affixing said cap to said mounting bracket.

* * * * *